Patented Apr. 3, 1951

2,547,696

UNITED STATES PATENT OFFICE 2,547,696

SOLUBLE FUSIBLE UNSATURATED HALOGEN-CONTAINING RESINS MADE BY POLYMERIZATION OF MIXTURE OF DI-2-ALKENYL MALEATE, DI-2-ALKENYL FUMARATE AND BROMOMETHANE COMPOUND TYPIFIED BY BROMOTRICHLOROMETHANE

Frederick J. Foster, New York, N. Y., assignor to United States Rubber Company, New York, N. Y., a corporation of New Jersey No Drawing. Application April 23, 1948, Serial No. 22,952

9 Claims. (Cl. 260—78.5)

This invention relates to the preparation of a novel class of soluble, unsaturated halogen-containing resins derived from the esters of allyl and 2-alkylallyl alcohols with maleic acid and fumaric acid, which esters are hereinafter designated as di-2-alkenyl esters of maleic and fumaric acids. The invention particularly relates to the preparation of flame-resistant resins by the reaction of diallyl maleate and diallyl fumarate with selected bromomethane compounds to produce soluble fusible resins and interpolymerization of these resins with a cheap monomer, viz., styrene.

The copending application of Robert A. Gregg, Serial No. 761,741 filed July 17, 1947, describes the preparation of flame-resistant resins by the polymerization of a monomeric di-2-alkenyl ester of an alpha-unsaturated dicarboxylic acid, in the presence of a bromomethane compound of the general formula $BrCX_3$ where the X's are selected from the group consisting of hydrogen, bromine and chlorine, at least two of the X's being halogen, to a soluble fusible resin which is capable upon further polymerization of yielding an insoluble infusible resin.

When di-2-alkenyl fumarate is used as the ester in the process described in the Gregg application, e. g., when diallyl fumarate is reacted with bromotrichloromethane to form a soluble, fusible convertible resin, the reaction is highly exothermic and cannot be adequately controlled in large scale batches, particularly if it is attempted to carry the reaction to a relatively advanced degree of polymerization, as exemplified by a final Gardner-Holt viscosity of the reaction mixture of about 100 seconds or more at 25° C. For efficient commercial production of castings, laminates, etc. it is essential that the reaction be carried to a relatively advanced degree of polymerization in order to obtain convertible resins which can be cured to products of good physical properties at a rapid rate. The resin can be interpolymerized readily with styrene and other monomers to the insoluble infusible stage.

On the other hand, when di-2-alkenyl maleate is used as the ester in the invention of Gregg, e. g., when diallyl maleate is reacted with bromotrichloromethane, the reaction can be readily controlled, even at high viscosities, but the resulting resin exhibits the peculiar property that it cannot be interpolymerized readily with styrene to the insoluble, infusible stage, since it is not readily copolymerizable therewith. This is a very serious objection since interpolymerization with a cheap monomer, viz., styrene, to the insoluble infusible stage to give good castings, laminates, etc., is essential to successful commercial use of resins made by the polymerization of monomeric di-2-alkenyl esters of alpha-unsaturated dicarboxylic acids in the presence of bromomethane compounds. I have now found that by the use of a mixture of a monomeric di-2-alkenyl ester of maleic acid and a monomeric di-2-alkenyl ester of fumaric acid in the reaction with the bromomethane compound of the type described above, the above objections to the use of either of such esters alone are overcome. By the use of mixtures of di-2-alkenyl esters of maleic and fumaric acids, the reaction with the bromomethane compound is readily controlled, even in large scale batches, and even when carried to high viscosities, and the soluble convertible resins obtained can be readily converted to insoluble, infusible state by interpolymerization with styrene or other interpolymerizable monomers at rapid rates under moderate curing conditions.

The relative proportion of the di-2-alkenyl maleate and the di-2-alkenyl fumarate employed in practicing my invention may vary widely. Within the broader aspects of my invention, it is sufficient if a substantial proportion of each be present. However, I prefer to employ from 15 to 80% by weight of the di-2-alkenyl maleate and correspondingly from 85 to 20% by weight of the di-2-alkenyl fumarate. These percentages are based on the sum of the weights of the di-2-alkenyl maleate and the di-2-alkenyl fumarate.

As disclosed in the Gregg application mentioned above, the polymerization of monomeric di-2-alkenyl esters of the alpha-unsaturated dicarboxylic acids in the presence of a bromomethane compound having the general formula $BrCX_3$ where the X's are selected from the group consisting of hydrogen, bromine and chlorine, at least two of the X's being halogen, effects a marked modification of the resulting resin, the bromomethane compound participating in a reaction with the di-2-alkenyl ester undergoing polymerization to an extensive degree and thereby effecting introduction into the polymerized reaction product of a considerable proportion of combined halogen which renders the product flame-resistant and in many cases self-extinguishing. Moreover, the premature gelation of the polymerizing di-2-alkenyl ester encountered by the art is suppressed to such a marked extent that a major proportion of the monomeric di-2-alkenyl ester can be readily converted to the soluble polymeric form.

The resins of my invention are prepared by polymerizing a mixture of a di-2-alkenyl ester of maleic acid and a di-2-alkenyl ester of fumaric acid, the di-2-alkenyl esters preferably being selected from the class consisting of diallyl and di-2-alkylallyl, e. g., dimethallyl, esters of maleic and fumaric acids, the di-2-alkenyl groups in the two esters usually being identical, in the presence of the bromomethane compound described above. The resulting resins are secured in high yields and contain very appreciable amounts of halogen, usually from 5 to 50% of combined halogen and preferably from 25 to 50%.

The bromomethane compounds having the general formula given above are as follows:

| | |
|---|---|
| Carbon tetrabromide | CBr$_4$ |
| Tribromochloromethane | CBr$_3$Cl |
| Dibromodichloromethane | CBr$_2$Cl$_2$ |
| Bromotrichloromethane | CBrCl$_3$ |
| Bromoform | CHBr$_3$ |
| Dibromochloromethane | CHBr$_2$Cl |
| Bromodichloromethane | CHBrCl$_2$ |

Of the bromomethane compounds enumerated bromotrichloromethane is preferred since it is especially effective. Carbon tetrabromide is also very effective. However, if desired, any of the other bromomethane compounds enumerated may be employed in practicing my invention.

As used herein the term "di-2-alkenyl esters" denotes the esters of maleic and fumaric acid with alcohols having the general formula

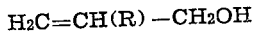

$$H_2C=CH(R)-CH_2OH$$

where R is hydrogen or alkyl and comprehends the diallyl esters, the di-2-alkylallyl and mixed allyl 2-alkylallyl esters, e. g., an ester wherein one carboxylic group is esterified with allyl alcohol and the other with methallyl alcohol. The principal 2-alkylallyl alcohol is methallyl alcohol although substitution with alkyl groups higher than methyl (usually having not more than four carbon atoms) such as ethyl, propyl or butyl, in the 2-position on the allyl group, is within the broad purview of my invention. I prefer to employ a mixture of diallyl maleate and diallyl fumarate in practicing my invention.

If desired, a third monomeric monoethylenic copolymerizable compound, e. g., styrene, methylacrylate, methyl methacrylate and acrylonitrile may be incorporated in the mixture of di-2-alkenyl maleate, di-2-alkenyl fumarate and the bromomethane compound in order to secure desirable variations in the properties of the polymeric products. However, I usually do not employ such third monomeric compound in the reaction with the bromomethane compound.

As noted in the prior art, the premature gelation of a polymerizing di-2-alkenyl ester can be postponed to some extent by carrying out the reaction in the presence of an inert solvent such as carbon tetrachloride but the volume of solvent required is prohibitively large for economical operation and the amount of halogen introduced into the resulting polymer is insignificant. I have found that the polymerization of the mixture of di-2-alkenyl maleate and di-2-alkenyl fumarate in the presence of as little as 5% of its weight of the bromomethane compound effects a very significant increase in the amount of monomeric esters converted to the desired soluble polymeric form and likewise introduces an appreciable amount of halogen into the polymer.

For example, the use of 5% by weight of bromotrichloromethane based on the weights of the di-2-alkenyl maleate and fumarate yields a soluble polymer containing over 9% of combined halogen whereas polymerization in the presence of 500% by weight of carbon tetrachloride yields a polymer containing less than 2% of halogen. As the amount of the bromomethane compound employed is increased, both the yield and the halogen content of the resulting soluble polymers are increased whereby the major proportion of the monomeric di-2-alkenyl maleate and fumarate can be readily converted to the polymeric form without any danger of gelation. While optimum yields of soluble polymers may be secured from reaction mixtures containing as much as 250% of the bromomethane compound based on the di-2-alkenyl maleate and fumarate, I have found that the reactant mixtures need not contain more than 200% of the bromomethane compound (based on the di-2-alkenyl maleate and fumarate) for most applications. In fact, for reasons of economy and efficiency I ordinarily prefer to employ from 35 to 100% by weight of the bromomethane compound since the polymers produced from reactant mixtures containing such amounts possess the requisite flame-resistance.

All of the polymers of the present invention are completely self-extinguishing by ASTM Test D-638-44 when they contain in excess of approximately 25% by weight of combined halogen. For example, the use of as little as 35% by weight of bromotrichloromethane yields a flame-proof resin whereas polymerization in the presence of as much as 500% by weight of the carbon tetrachloride disclosed by the prior art yields a readily combustible polymer.

It will be seen that the amount of the selected bromomethane compound employed in practicing the present invention may range from 5 to 250% by weight based on the total weight of di-2-alkenyl maleate and fumarate, and preferably ranges from 35 to 100%.

The percentage of combined halogen in the resins made by my invention may vary widely depending upon many factors but will ordinarily range from 5 to 50% and is preferably in excess of 25% by weight.

The proportion of third monomeric copolymerizable material which may be incorporated in the original reaction mixture, where such third material is used, may vary widely. Generally, the weight of such third material will range from 10 to 100% by weight based on the weight of the monomeric di-2-alkenyl maleate and fumarate.

In practicing my invention, a mixture of the di-2-alkenyl maleate, the di-2-alkenyl fumarate and the bromomethane compound, with or without the addition of another copolymerizable third monomer, is heated at temperatures ranging from 25 to 100° C. and preferably in the neighborhood of 60° C., i. e., from 55 to 65° C. The reaction is promoted by known polymerization catalysts of which the peroxidic compounds such as diacetyl peroxide, di-tertiarybutyl peroxide, acetyl benzoyl peroxide and dibenzoyl peroxide are preferred. The peroxidic catalyst may conveniently be employed in concentrations of from 0.1 to 3.0% by weight of the reactant mixture (monomeric esters plus bromomethane compound, plus third monomer, if used). It is preferable to conduct the polymerization in an inert atmosphere, e. g., nitrogen, to insure the formation of clear water-white products.

The time required for the polymerization may vary widely depending upon many factors including the specific di-2-alkenyl esters employed, the temperature, the type and amount of polymerization catalyst and the type and amount of any third monomeric copolymerizable material present. Ordinarily a reaction time ranging from 3 to 25 hours will be employed. The course of the polymerization may be readily followed by observing the increase in viscosity or in the refractive index of the reaction mixture and when the reaction has proceeded to the desired extent it may be halted by cooling.

Since the polymerization is exothermic, industrial-scale preparations require only moderate heating. Control of the reaction may be insured by gradual addition of the bromomethane compound, or of a major proportion thereof to the polymerizing mixture of the di-2-alkenyl maleate and di-2-alkenyl fumarate and the polymerization catalyst with vigorous agitation of the mixture. The addition of the bromomethane compound may be either continuous or intermittent, the former being preferred. If desired, the polymerization catalyst may be added in admixture with all or a major portion of the bromomethane compound.

Since the viscous syrup-like reaction mixtures of my invention contain no insoluble gel such as is commonly encountered in prior art polymerizations they can be employed directly and without prior art modifications in a wide variety of commercial applications. Alternatively the resins can be obtained in the solid form by precipitation thereof from the reaction mixture by means of a non-solvent, e. g., n-hexane. My resins can be used alone or in conjunction with suitable dyes, fillers, stabilizers, e. g. calcium stearate, magnesium oxide etc., plasticizers and solvents. Upon heating compositions containing my polymers to elevated temperature and preferably with polymerization catalysts, e. g., peroxides, they are converted to a solvent-and-heat-resistant form ranging in character from flame-retardant to completely non-flammable in proportion to their halogen content as discussed above. In the preferred practice of my invention the soluble fusible reaction product of the di-2-alkenyl maleate, di-2-alkenyl fumarate and the bromomethane compound is admixed with styrene and the resulting mixture is polymerized to the insoluble, infusible stage, usually by the admixture of a suitable proportion of a peroxidic polymerization catalyst such as those mentioned above and subjection to elevated temperature for the requisite period of time. The amount of the polymerization catalyst employed may conveniently range as before from 0.1 to 3.0% by weight of the mixture of the soluble fusible resin and the styrene.

The proportion of styrene interpolymerized with the soluble fusible resin in accordance with the preferred practice of my invention may vary widely but preferably ranges from 5 to 50% by weight based on the weight of the soluble fusible reaction product of the di-2-alkenyl maleate, the di-2-alkenyl fumarate and the bromomethane compound. The proportion will vary depending upon the properties desired in the final product but preferably it is such that the proportion of combined halogen in the final cured resin is still sufficient to render it flame-resistant, the ranges given above for the halogen content of the fusible resin applying equally to the final insoluble, infusible resin.

The temperature at which the mixture of the soluble fusible resin and the styrene is heated to effect polymerization to the insoluble infusible state, may likewise vary widely but usually will be within the range of from 60° to 100° C.

Instead of using styrene as the interpolymerizable monomer, I may use other reactive monomeric ethylenic compounds, copolymerizable with the soluble fusible resin to the insoluble infusible state, such as vinyl acetate, acrylic esters, e. g., methyl acrylate, methyl methacrylate, ethyl acrylate, acrylonitrile, allyl esters, diethyl fumarate, etc. However, because of their high cost there is no advantage in using such compounds other than styrene for many purposes. My invention is most advantageously applied with styrene because as pointed out above the soluble fusible resin obtained from the maleate alone, in accordance with the Gregg application above identified exhibits the peculiarity that it is not readily copolymerizable with styrene which is the most economically advantageous copolymerizable monomeric ethylenic compound. I may also use alkyd resins, particularly flame-resistant alkyd resins such as those derived from tetrachlorophthalic anhydride, usually in combination with styrene.

In some cases the fusible, soluble polymerization reaction product resulting from the initial polymerization of the di-2-alkenyl esters in the presence of the bromomethane compound may be employed directly in that form where it is desired to take advantage of its fusible, soluble nature and its flame-resistant properties. For example, it may be employed where its thermoplastic or soluble properties are advantageous. Thus it may be admixed with a suitable solvent to give a coating or impregnating composition. In any event, however, it is generally preferred to convert it ultimately to the insoluble, substantially infusible stage.

The following examples disclose my invention in more detail; all parts being by weight.

Example I (A) The following materials were employed:

| | Parts |
|---|---|
| Diallyl fumarate | 2058 |
| Diallyl maleate | 686 |
| Bromotrichloromethane | 1862 |
| Benzoyl peroxide | 28 |

350 parts of bromotrichloromethane and all of the diallyl fumarate and diallyl maleate were placed in a glass lined reaction vessel equipped with an agitator, thermometer, nitrogen inlet, and a thermostatically controlled water jacket maintained at 60° C. An atmosphere of nitrogen was maintained in the vessel. When the temperature of the reaction mixture reached 58° C., the gradual addition of the remainder of the bromotrichloromethane containing the catalyst was begun. The addition required about three hours. Heating at 60° C. was continued for about 4 hours, at which time the viscosity of the mixture was 700 seconds as determined by the Gardner-Holt method at 25° C. The reaction mixture was then cooled by circulating cold water through the jacket, and 5 parts of hydroquinone, dissolved in a little butanol, was added to inhibit further polymerization.

(B) One hundred parts of the reaction product made as in (A) were mixed with 2 parts of benzoyl peroxide and poured into cylindrical molds. After heating for 3 hours at 90° C. a hard, clear, acetone-insoluble and non-inflammable casting was obtained.

Eighty parts of the reaction product made as in (A) were mixed with 20 parts of styrene and 2 parts of benzoyl peroxide, and poured into a mold. After heating for 2 hours at 90° C. an exceptionally hard, clear, acetone-insoluble and self-extinguishing casting was obtained. The casting had the following properties: Barcol hardness, 26; flexural modulus, 450,000 p. s. i.; flexural strength, 15,000 p. s. i.; tensile strength, 6,000 p. s. i.; specific gravity, 1.51. The castings were superior to those obtained from commercially available flame-resistant alkyd resin preparations in resistance to heat softening and light aging.

A mixture of 80 parts of the reaction product made as in (A), 20 parts of styrene, and 2 parts of benzoyl peroxide was used to prepare 2-ply laminates with glass cloth. The laminate was cured for 5 minutes at 100° C., followed by 5 minutes at 110° C. The laminate had a Barcol hardness of 23, and was rated self-extinguishing by the ASTM test.

*Example II*

(A) The following materials were employed:

| | Parts |
|---|---|
| Diallyl fumarate | 196 |
| Diallyl maleate | 196 |
| Bromotrichloromethane | 266 |
| Benzoyl peroxide | 4.0 |

All of the diallyl fumarate and diallyl maleate and 50 parts of bromotrichloromethane containing 2 parts of benzoyl peroxide were placed in a glass-lined reaction vessel as in Example I. The reaction mixture was heated to 60° C. The remainder of the bromotrichloromethane and catalyst was added gradually over a period of several hours. After the reaction mixture had been heated at 60° C. for a total of about 7 hours, 0.06 part of hydroquinone was added, the batch was cooled, and the viscosity of the mixture was 284 seconds as determined by the Gardner-Holt method at 25° C.

(B) Eighty parts of the reaction product made as in (A) were mixed with 20 parts of styrene and 2 parts benzoyl peroxide and a laminate was prepared with glass cloth as in Example I. The laminate was cured in 5 minutes at 100° C. plus 10 minutes at 120° C. to a Barcol hardness of 23.

*Example III*

This example illustrates the uncontrollable nature of the reaction when diallyl fumarate is employed without diallyl maleate.

The following materials were employed:

| | Parts |
|---|---|
| Diallyl fumarate | 392 |
| Bromotrichloromethane | 266 |
| Benzoyl peroxide | 4 |

Part of the bromotrichloromethane and catalyst was placed in the reaction vessel with the diallyl fumarate and the remainder of the bromotrichloromethane and catalyst were added gradually as previously. After reacting for seven hours at 60° C. the viscosity of the reaction mixture was 100 seconds (Gardner-Holt at 25° C.) and began to increase rapidly. The reaction vessel was immersed in a bath of acetone and dry ice in order to cool the mixture as rapidly as possible to halt the reaction. The mixture was quickly cooled to 15° C. However, as soon as the cooling bath was removed the reaction mixture again began to polymerize rapidly and turned into a hard brown insoluble mass.

*Example IV*

Example II was repeated, except that 392 parts if diallyl maleate ws employed and the diallyl fumarate was omitted. Eighty parts of the resulting resin was mixed with 20 parts of styrene and 2 parts of benzoyl peroxide and the mixture was subjected to curing conditions as in the previous examples. The resulting casting did not have satisfactory physical properties and was of cheesy consistency as a result of the inability of the resin to form a useful product with styrene.

It should be noted that in all cases I prefer to carry the polymerization reaction, by which my improved soluble, flame-resistant resins are obtained, to a relatively advanced stage. I find that when carried to relatively advanced stages of polymerization, these resins are capable of being converted to the insoluble, infusible state, with or without a copolymerizable monomer such as styrene, at rapid rates under moderate curing conditions, so that laminates, castings, etc. of good properties can be produced rapidly and economically. Thus, a satisfactory degree of polymerization is represented by a viscosity of at least 100 seconds, and preferably more, e. g., 300 to 800 seconds, measured by the Gardner-Holt method at 25° C., on the reaction mixture containing the mixed diallyl esters and the bromomethane compound, in the substantial absence of other modifying ingredients or diluents.

Having thus described my invention, what I claim and desire to protect by Letters Patent is:

1. A soluble fusible unsaturated halogen-containing resin which is the reaction product obtained by polymerization of a monomeric di-ester of maleic acid with an alcohol selected from the group consisting of allyl alcohol and 2-alkylallyl alcohols and a monomeric di-ester of fumaric acid and with an alcohol selected from the group consisting of allyl alcohol and 2-alkylallyl alcohols in the presence of a bromomethane compound of the general formula $BrCX_3$ where the X's are selected from the group consisting of hydrogen, bromine and chlorine, at least two of the X's being halogen.

2. A soluble fusible unsaturated halogen-containing resin which is the reaction product obtained by polymerization of diallyl maleate and diallyl fumarate in the presence of a bromomethane compound of the general formula $BrCX_3$ where the X's are selected from the group consisting of hydrogen, bromine and chlorine, at least two of the X's being halogen.

3. The process of making a soluble fusible unsaturated halogen-containing resin which comprises polymerizing a monomeric di-ester of maleic acid with an alcohol selected from the group consisting of alyl alcohol and 2-alkylallyl alcohols and a monomeric di-ester of fumaric acid with an alcohol selected from the group consisting of allyl alcohol and 2-alkylallyl alcohols in the presence of a bromomethane compound of the general formula $BrCX_3$ where the X's are selected from the group consisting of hydrogen, bromine and chlorine, at least two of the X's being halogen, until a soluble fusible unsaturated resin is obtained.

4. The process which comprises polymerizing a monomeric di-ester of maleic acid with an alcohol selected from the group consisting of allyl alcohol and 2-alkylallyl alcohols and a monomeric di-ester of fumaric acid with an alcohol selected from the group consisting of allyl alcohol and 2-alkylallyl alcohols in the presence of a bromomethane compound of the general formula $BrCX_3$ where the X's are selected from the group consisting of hydrogen, bromine and chlorine, at least two of the X's being halogen, until a soluble fusible unsaturated resin is produced, admixing said resin with styrene, and polymerizing the resulting mixture to an insoluble, infusible resin.

5. A polymerizable mixture comprising a soluble fusible unsaturated halogen-containing resin which is the reaction product obtained by polymerization of a monomeric di-ester of maleic acid with an alcohol selected from the group consisting of allyl alcohol and 2-alkylallyl alcohols, a monomeric di-ester of fumaric acid with an alcohol selected from the group consisting of allyl alcohol and 2-alkylallyl alcohols in the presence of a bromomethane compound of the general formula $BrCX_3$ where the X's are selected from the group consisting of hydrogen, bromine and chlorine, at least two of the X's being halogen, and styrene, said mixture being capable of yielding upon polymerization an insoluble, infusible resin.

6. The process which comprises polymerizing monomeric diallyl maleate and monomeric diallyl fumarate in relative proportions of from 15 to 80% by weight of diallyl maleate and correspondingly from 85 to 20% by weight of diallyl fumarate in the presence of a bromomethane compound of the general formula $BrCX_3$ where the X's are selected from the group consisting of hydrogen, bromine and chlorine, at least two of the X's being halogen, the amount of said bromomethane compound ranging from 35 to 100% by weight of said diallyl maleate and diallyl fumarate, until a soluble fusible unsaturated resin is produced, admixing said resin with monomeric styrene in a proportion of from 5 to 50% by weight based on the weight of said resin, and polymerizing the resulting mixture to an insoluble, infusible resin.

7. The process of claim 6 wherein said bromomethane compound is bromotrichloromethane.

8. A polymerizable mixture comprising a soluble fusible unsaturated halogen-containing resin which is the reaction product obtained by polymerization of monomeric diallyl maleate and diallyl fumarate in relative proportions of from 15 to 80% by weight of diallyl maleate and correspondingly from 85 to 20% by weight of diallyl fumarate in the presence of a bromomethane compound of the general formula $BrCX_3$ where the X's are selected from the group consisting of hydrogen, bromine and chlorine, at least two of the X's being halogen, the amount of said bromomethane compound ranging from 35 to 100% by weight of said diallyl maleate and diallyl fumarate, and monomeric styrene in a proportion of from 5 to 50% by weight based on the weight of said resin, said mixture being capable of yielding upon polymerization an insoluble, infusible resin.

9. A mixture as recited in claim 8 wherein said bromomethane compound is bromotrichloromethane.

FREDERICK J. FOSTER.

REFERENCES CITED

The following references are of record in the file of this patent:

UNITED STATES PATENTS

| Number | Name | Date |
|---|---|---|
| 2,436,256 | Hanford et al. | Feb. 17, 1948 |

OTHER REFERENCES

Norrish et al, article in Proc. Royal Soc. A 163, pages 205–220. (1937)